March 14, 1939. K. P. BRACE 2,150,142
THERMAL CONTROL
Filed Aug. 21, 1936
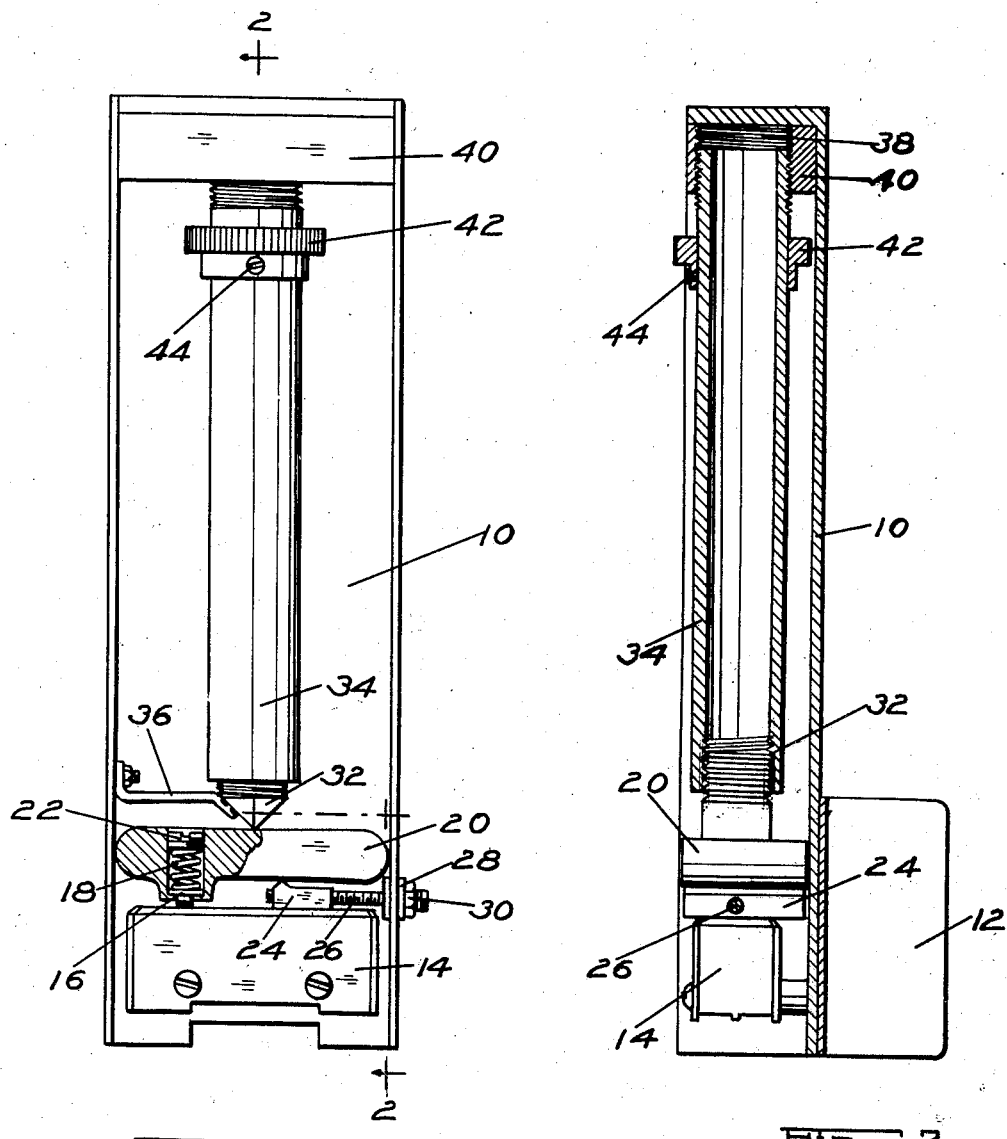
INVENTOR.
KEMPER P. BRACE
BY
McConkey & Booth
ATTORNEYS.

Patented Mar. 14, 1939

2,150,142

UNITED STATES PATENT OFFICE 2,150,142

THERMAL CONTROL

Kemper P. Brace, South Bend, Ind., assignor to International Engineering Corporation, Chicago, Ill., a corporation of Illinois Application August 21, 1936, Serial No. 97,103

3 Claims. (Cl. 200—137)

This invention relates to controls, and is illustrated as embodied in a thermostatically-actuated switch.

An object of the invention is to provide a compact control device having a very sensitive and easily-operated adjustment for purposes of calibration.

One important feature relates to the operation of a switch lever or the like by a thermally-expanded member differentially connected at its opposite ends to a thrust member acting on the lever, and to a fixed abutment. In the arrangement illustrated, this member is a tube which is differentially threaded at its ends onto the thrust member and into a socket formed in the abutment.

Another feature relates to providing the switch lever with an adjustable fulcrum, a preferred form of which is described below.

The above and other objects and features of the invention, including various novel combinations of parts and desirable particular constructions, will be apparent from the following description of the illustrative embodiment shown in the accompanying drawing, in which:

Figure 1 is a front elevation of the control, with the switch lever partly broken away in section; and Figure 2 is a vertical section therethrough on the line 2—2 of Figure 1.

The illustrated embodiment comprises a support 10, provided with a suitable bracket or the like 12 for mounting it wherever it is to be used, and on which is mounted a switch 14 of any desired construction. The switch is provided with suitable means (not shown) for actuation by a plunger 16 yieldingly backed up by a spring 18 arranged in a bore in a switch lever 20 and held in place by a suitable plug 22.

The lever 20 preferably fulcrums on a transverse knife-edge formed on a member 24 resting on, and held from turning by, the upper face of the switch 14. The position of the fulcrum may be adjusted by shifting member 24 by means such as a part 26 threaded therethrough and passing through a fitting 28 mounted on a flange of the support 10 and which interengages with the part 26 to hold it against axial movement. The desired setting, when attained, may be preserved by means such as a locknut 30.

The upper face of the lever 20, between the fulcrum 24 and the plunger 16, is engaged by a transverse knife-edge formed on a thrust member 32 formed with threads by means of which it is adjustably seated in the lower end of a thermally-expansible member such as a tube 34 of hard rubber, gutta percha, lumarith, Celluloid, or other material having a high coefficient of expansion.

A leaf spring 36, secured to one of the side flanges of the support 10, has its end bent to engage (and if desired be spot-welded or otherwise secured to) one of the flat sides of the lower portion of the thrust part 32, to hold it from turning, and yieldingly to urge it upwardly.

The upper end of the tube 34 is threaded into a socket 38 formed in an abutment 40 mounted on the upper end of the support 10. The threads on the thrust part 32 and in the socket 38 are of different pitch, so that turning the tube 34 shifts the part 32 very slowly up and down to give what is in effect a micrometer adjustment. The tube may have turning means, such as a knurled ring 42 attached thereto by means such as a setscrew 44.

Thus the effective leverage of the lever 20 may be adjusted by shifting the fulcrum 24, while the vertical position of the thrust part 32 may be very accurately and sensitively adjusted by turning the tube 34.

While one illustrative embodiment has been described in detail, it is not my intention to limit the scope of the invention to that particular embodiment, or otherwise than by the terms of the appended claims.

I claim:

1. A control comprising a support having mounted thereon a switch having a casing formed with a flat top and having near one end an operating part, a block having a flat lower face slidably resting on said flat top and having a knife-edge fulcrum on its upper face, means engaging said block and said support and operable to adjust said block along the switch casing toward and from said operating part, and an operating lever fulcrumed on said knife-edge fulcrum and acting on said operating part.

2. A control comprising a support having a switch mounted thereon and provided with an adjustable knife-edge member adjacent said switch, a lever fulcrumed on said member and having at one end means arranged to actuate the switch, a thrust member having a knife-edge engaging the opposite side of the lever between said member and said means and provided with means engaging the support and holding against turning, a part mounted on the support some distance from the lever and provided with a socket alined with said thrust member, and a thermally expansible tube differentially threaded at its ends onto said thrust member and into said socket.

3. A control comprising a support having a switch mounted thereon and provided with an adjustable knife-edge member adjacent said switch, a lever fulcrumed on said member and having at one end means arranged to actuate the switch, a thrust member having a knife-edge engaging the opposite side of the lever between said member and said means, an abutment mounted on the support some distance from the lever, and a thermally-expansible tube differentially connected at its ends to said thrust member and to said abutment.

KEMPER P. BRACE.